(12) United States Patent
Prudham

(10) Patent No.: US 8,102,093 B2
(45) Date of Patent: Jan. 24, 2012

(54) POLYPHASE ELECTRIC MOTOR ESPECIALLY FOR DRIVING PUMPS OR VENTILATORS

(75) Inventor: Daniel Prudham, Thise (FR)

(73) Assignee: Moving Magnet Technologies (MMT), Besancon (FR)

( * ) Notice: Subject to any disclaimer, the term of this patent is extended or adjusted under 35 U.S.C. 154(b) by 457 days.

(21) Appl. No.: 12/295,050

(22) PCT Filed: Mar. 28, 2007

(86) PCT No.: PCT/FR2007/051027
§ 371 (c)(1),
(2), (4) Date: Nov. 25, 2008

(87) PCT Pub. No.: WO2007/113436
PCT Pub. Date: Oct. 11, 2007

(65) Prior Publication Data
US 2009/0174280 A1    Jul. 9, 2009

(30) Foreign Application Priority Data

Mar. 30, 2006   (FR) ..................... 06 51117

(51) Int. Cl.
*H02K 1/00* (2006.01)
(52) U.S. Cl. ... 310/216.071; 310/216.072; 310/216.073; 310/216.074
(58) Field of Classification Search ........... 310/216.069, 310/216.012, 216.092, 216.081, 216.022, 310/216.004, 216.057, 216.73, 216.074, 310/216.091
See application file for complete search history.

(56) References Cited

U.S. PATENT DOCUMENTS

| | | | |
|---|---|---|---|
| 4,990,809 A * | 2/1991 | Artus et al. ................... | 310/192 |
| 5,880,551 A | 3/1999 | Prudham | |
| 6,114,789 A * | 9/2000 | Pengov et al. ................ | 310/166 |
| 2002/0175587 A1 | 11/2002 | Vollmer | |
| 2004/0095035 A1 | 5/2004 | Sogabe et al. | |
| 2005/0099086 A1* | 5/2005 | Schunk et al. ................ | 310/216 |
| 2005/0212374 A1* | 9/2005 | Mitcham ....................... | 310/216 |

FOREIGN PATENT DOCUMENTS

| | | |
|---|---|---|
| DE | 199 05 748 | 8/1999 |
| DE | 101 24 415 | 11/2002 |
| EP | 0 182 702 | 5/1986 |
| EP | 1 422 806 | 5/2004 |
| FR | 2 201 575 | 4/1974 |
| WO | 2005 074099 | 8/2005 |
| WO | 2006 029972 | 3/2006 |

* cited by examiner

*Primary Examiner* — Quyen Leung
*Assistant Examiner* — Leda Pham
(74) *Attorney, Agent, or Firm* — Oblon, Spivak, McClelland, Maier & Neustadt, L.L.P.

(57) ABSTRACT

A polyphase motor, for example for applications for driving pumps or ventilators in the automobile industry, including a stator part excited by electric coils and a rotor exhibiting N pairs of poles that are magnetized radially in alternate senses, the stator part exhibiting wide teeth and narrow teeth extending radially from an annular ring. The wide teeth carry the coil windings and the distance between a wide tooth and a narrow tooth is greater than the width of a narrow tooth.

30 Claims, 9 Drawing Sheets

POLYPHASE ELECTRIC MOTOR ESPECIALLY FOR DRIVING PUMPS OR VENTILATORS

BACKGROUND OF THE INVENTION

1. Field of the Invention

The present invention relates to a polyphase electric motor, more particularly for applications for driving pumps or ventilators in the automobile industry.

In the industrial and automobile fields, the selection of a polyphase motor for driving pumps or ventilators is made, depending on criteria which can be cost, performances and lifetime criteria. As regards the performances, the output and noise are more particularly estimated. To reach a good output, it is necessary to have a sufficient volume of copper to emit the resistive losses and a short magnetic circuit to minimise the iron losses. To reduce the level of noise as much as possible, a correct balance of the radial forces as well as a low detent torque will be aimed at. The cost of the motor is related to the cost of materials but also to the cost of the manufacturing and it is particularly important to provide an economical solution for the manufacturing of the coil winding.

2. Description of Related Art

Motors are known in the state of the art, such as described in the German patent DE19905748, exhibiting a correct balance of the radial forces but the structure of such motors does not allow a simple manufacturing of the coil winding by separately winding the coils and by inserting them into the stator. As a matter of fact, mastering the detent torque requires poles having as wide as possible a shape, in such motors, and the coil winding must be made by inserting the copper wire through particularly narrow cut-outs. In order to make the coil winding easier, certain motors thus exhibit a stator made of several parts, but the simplification of the coil winding is thus at the expense of the design of the statoric circuit which becomes complex because of this assembling of such a large number of pieces and thus it becomes costly.

Motors are also known in the state of the art, which make it possible to reach a particularly simple and economical manufacturing of the coil winding on a stator made in one piece while providing a low detent torque. However, such motors are not totally balanced as regards the radial forces, which is a disadvantage as regards noise and also as regards the bearing lifetime. Such motors are for example described in the American patent U.S. Pat. No. 5,880,551 also assigned to the applicant.

BRIEF SUMMARY OF THE INVENTION

The present invention thus aims at providing an economic and strong solution, adapted to mass production and exhibiting a very good level of performances as regards the output, thanks to the volume of copper and the short magnetic circuit and as regards noise through the balanced radial forces an the low level of detent torque.

For this purpose, the invention relates to a polyphase motor formed by a stator part excited by electric coils and by a rotor magnetised and exhibiting N pairs of poles of the type magnetised radially in alternate senses, the stator part exhibiting large teeth and narrow teeth extending radially from an annular ring. The wide teeth which support the coil windings have a width which is greater than or equal to the double of the width of the narrow teeth. The size of the width of the teeth as measured on the inner diameter of the stator uses a couple of values, for the wide teeth and the narrow teeth respectively, which has the property of cancelling the detent torques in the motor. The shape of the stator which exhibits coiled teeth having a constant rectangular section allows the introduction of each coil around a wide tooth, with the coils being manufactured separately, outside the stator. For this purpose, the width of the cut-out making it possible to receive the coil winding is greater than the width of a narrow tooth, said width being measured on the inner diameter of the stator.

BRIEF DESCRIPTION OF THE SEVERAL VIEWS OF THE DRAWINGS

The invention will be best understood upon reading the following description and while referring to the appended drawings where.

DETAILED DESCRIPTION OF THE INVENTION

Figure 2:
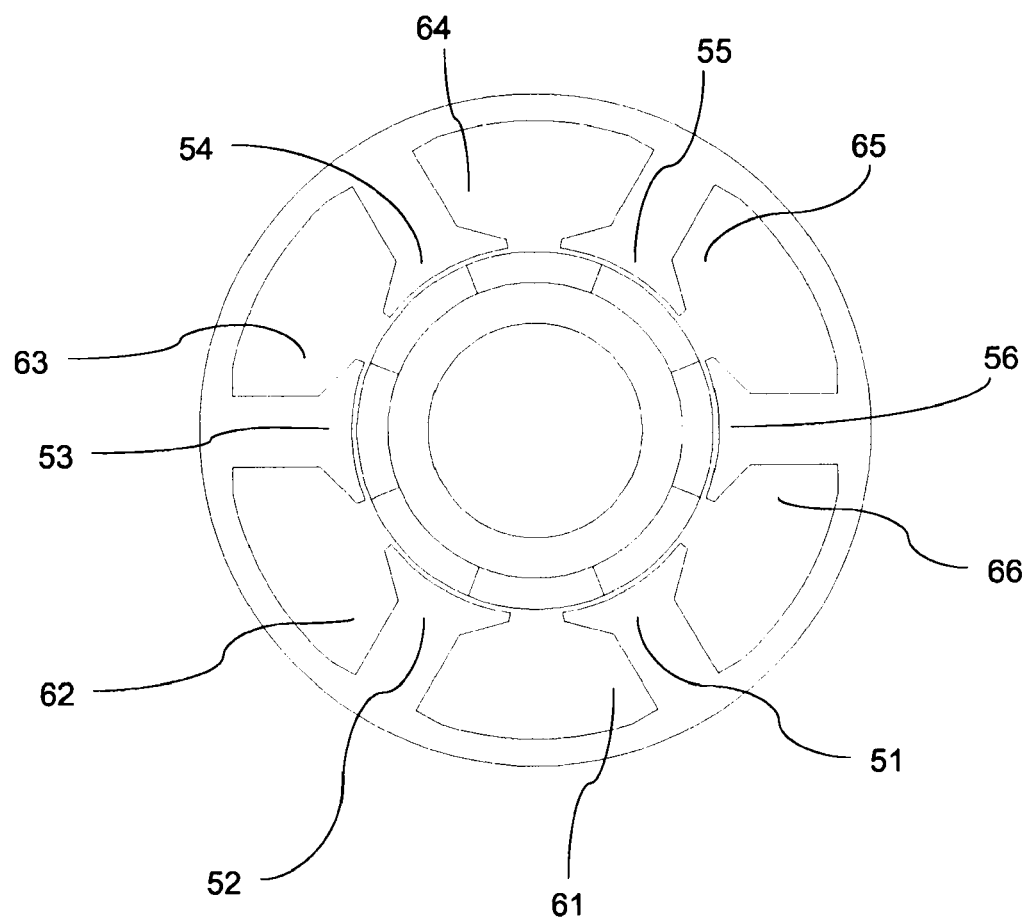
FIG. 2 shows a cross-sectional view of a motor according to the prior art, with the stator including 6 poles 51 to 56.
Figure 3:
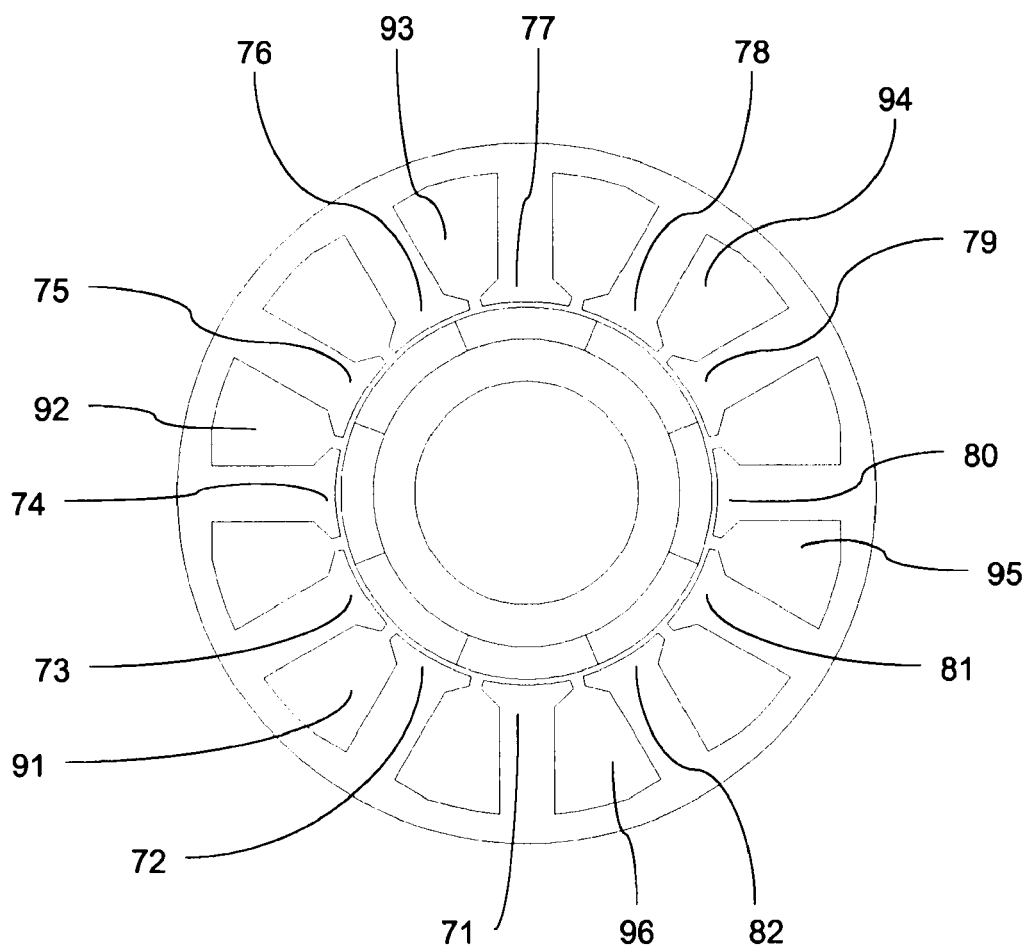
FIG. 3 shows a cross-sectional view of a motor according to the prior art, with the stator including 12 poles 71 to 82.
Figure 5:
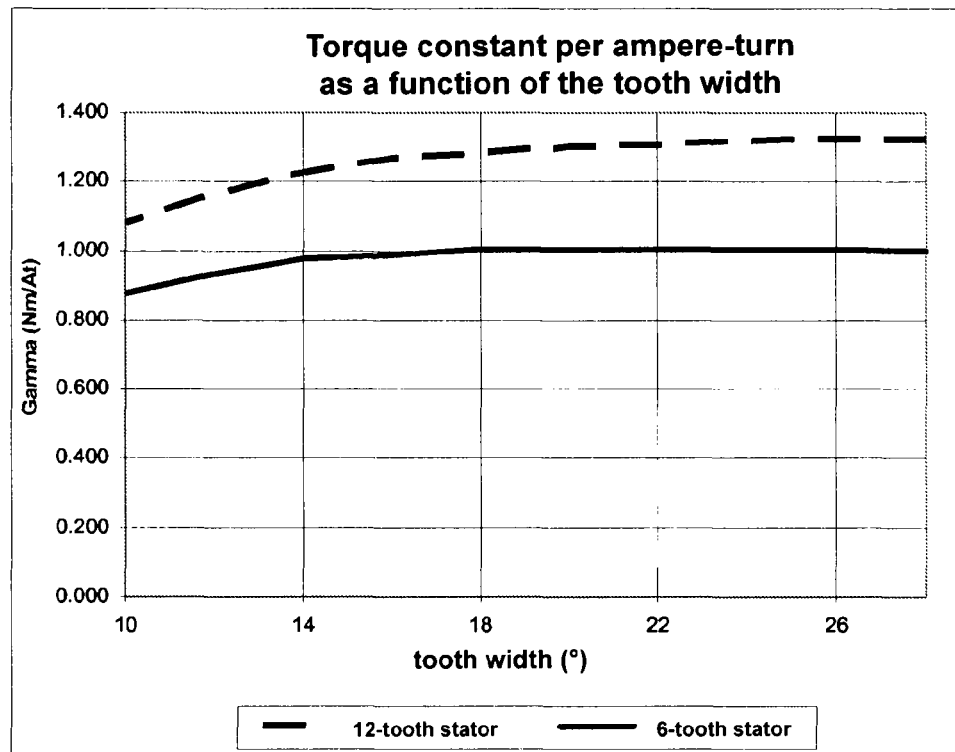
FIG. 5 shows a diagram showing the evolution of the constant of the couple per ampere/turn depending on the tooth width respectively, for 6- and 12-tooth stators.

In the motors of the prior art such as shown in FIGS. 2 and 3, a low detent torque is wanted by widening as much as possible the stator poles 51 to 56 and 71 to 82, which leaves a small width of cut-out for introducing the winding wire. This makes the manufacturing of the coil windings 61 to 66 and 91 to 96 complex, difficult to automate and does not give very good fill factors. What is true for the 6-tooth stator is increased for the 12-tooth stator. As shown in FIG. 5, however, the performances are clearly more advantageous for the 12-tooth stator with a torque constant per ampere/turn which is increased by more than 30%.

Figure 4:
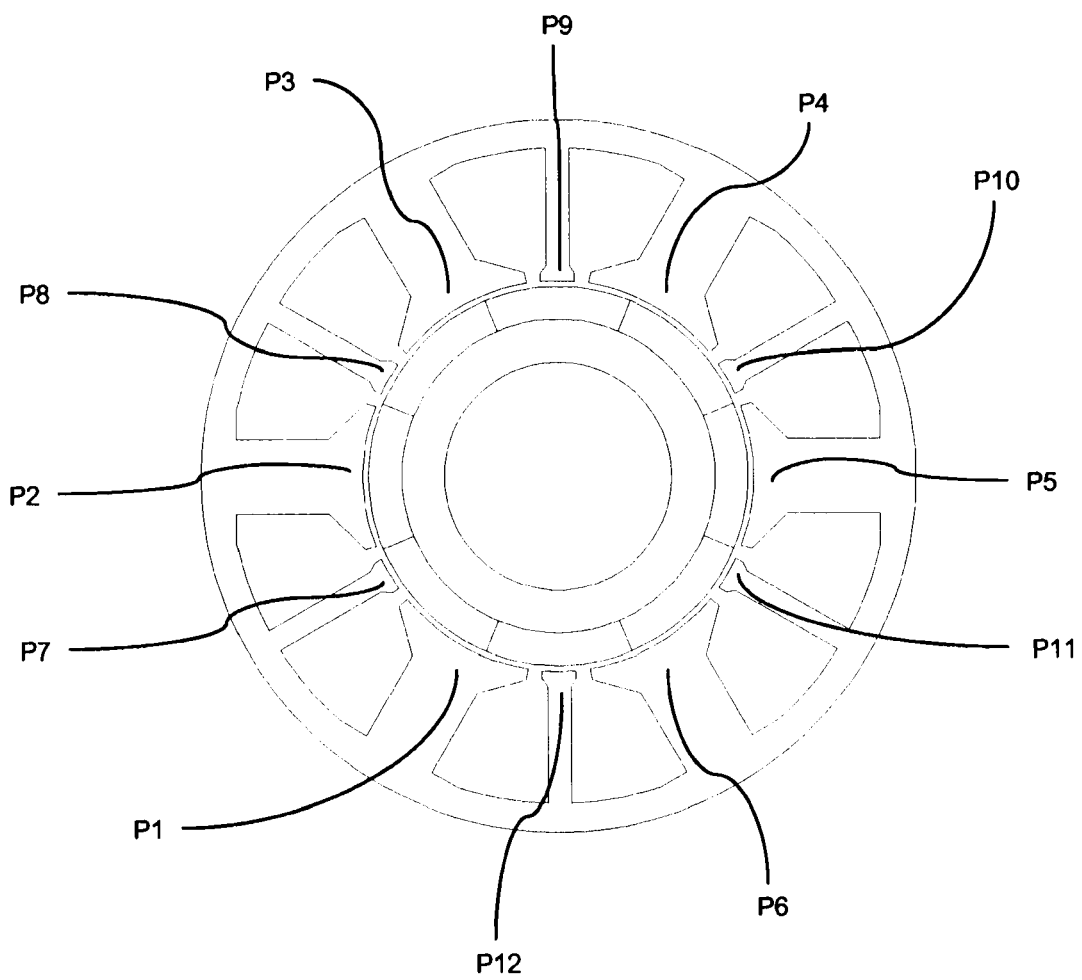
FIG. 4 shows a cross-sectional view of a motor according to the prior art, with the stator including 6 wide poles P1 to P6 and 6 narrow poles P7 to P12.

In the motors of the prior art such as shown in FIG. 4, narrow poles P7 to P12 are introduced into the stator structure between the wide poles P 1 to P6. This efficiently makes it possible to take advantage of the increase in the couple per ampere/turn without reducing the volume of copper. But then again the stator poles fill almost the whole inner circumference of the stator and leave only narrow cut-outs to introduce the coil winding wire. This quasi continuity of the inner circumference of the stator makes it possible to obtain low torques detent torques for the motor.

Figure 6:
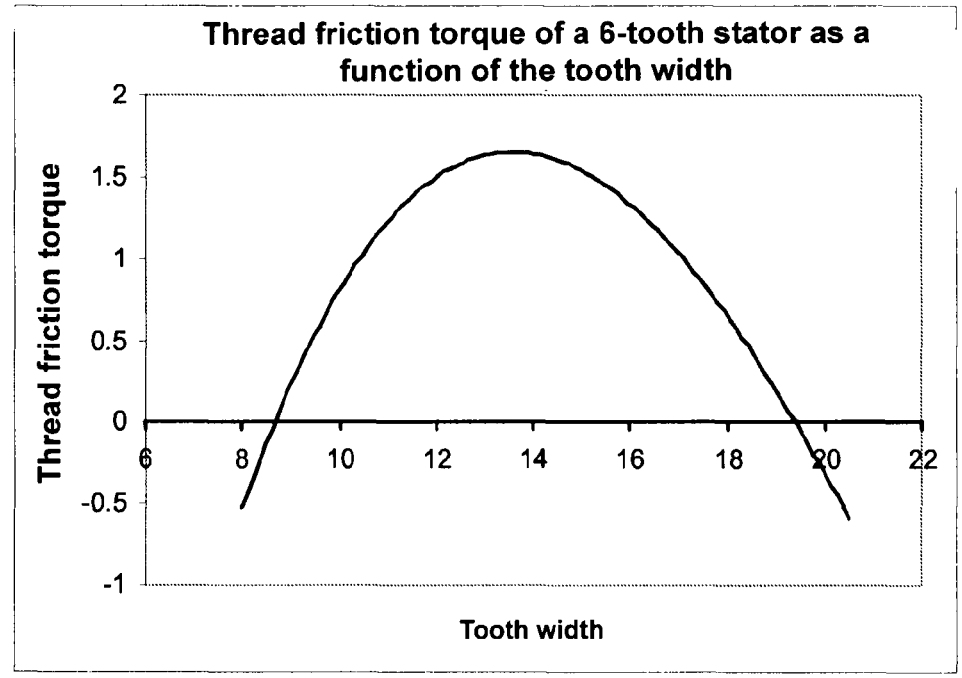
FIG. 6 shows a curve showing the evolution of a detent torque with respect to the tooth width of a 6-tooth stator.

FIG. 6 shows that, contrarily to what is usually made, narrow stator poles also make it possible to obtain very low detent torques. As a matter of fact, as the curve of the detent torque drawn according to the tooth width of a 6-tooth stator shows, there are 2 tooth widths for which the detent torque is null. It will thus be possible to determine 2 tooth widths for a motor, making it possible to obtain a low detent torque. These 2 tooth widths correspond on the one hand to a relatively wide tooth and on the other hand to a tooth having a width smaller than half the preceding one.

Figure 1:
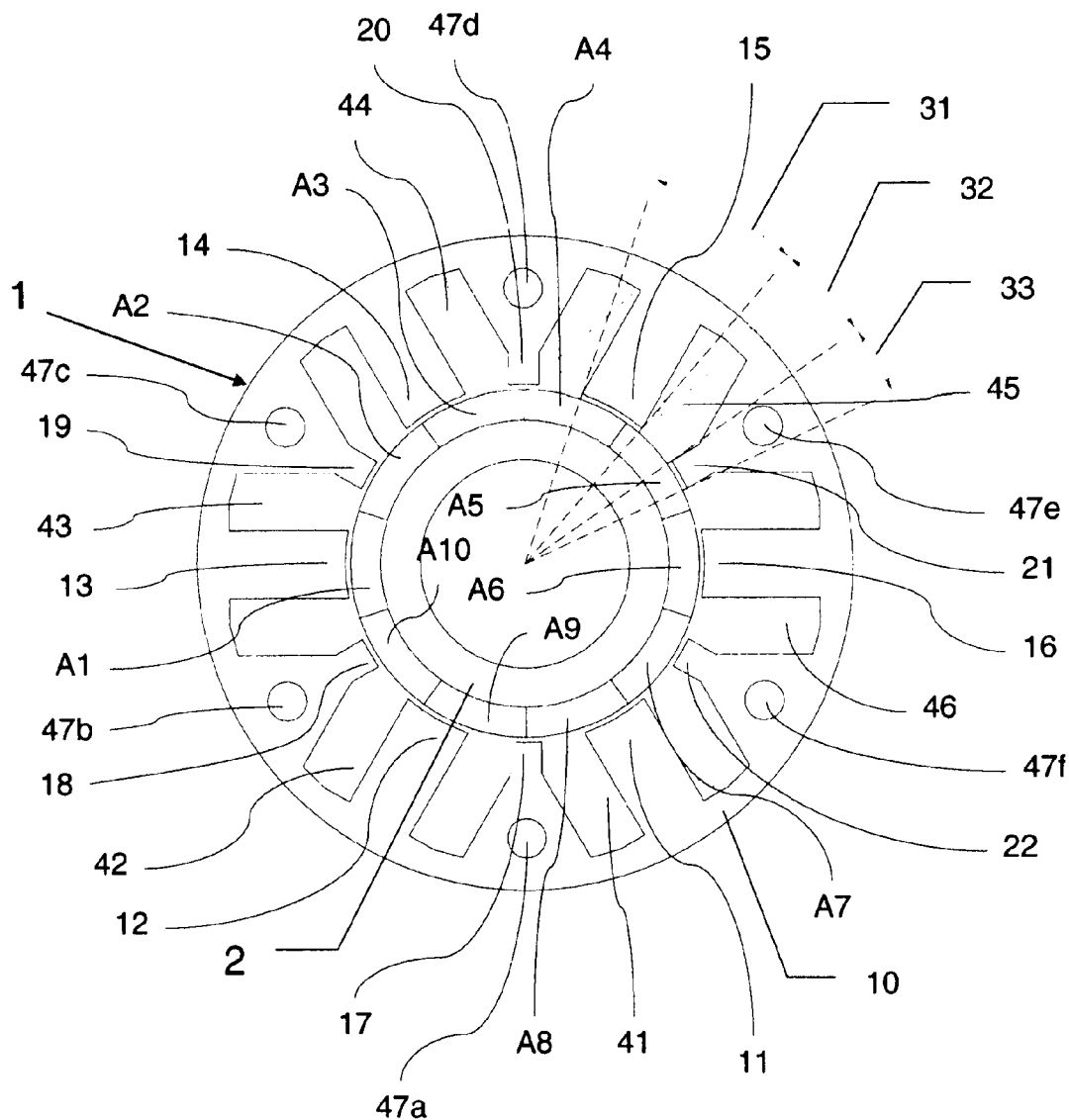
FIG. 1 shows a cross-sectional view of a motor according to the invention. The motor includes a stator 1 exhibiting 6 wide teeth 11 to 16 and 6 narrow teeth 17 to 22 and a rotor 2 exhibiting N pairs of poles A1 to A10 which are magnetised radially in alternate senses.

The motor according to the invention, as shown in FIG. 1, shows a 12-tooth structure which gives the best torque constant and uses for the stator 1 width teeth 11 to 16 and narrow teeth 17 to 22 making it possible to obtain a very low detent torque through an advisable selection of the poles widths. The width ratio of the wide teeth to the narrow teeth is then 2.2.

The coil windings 41 to 46 are positioned around the wide teeth 11 to 16, which makes it possible to obtain the maximum torque per ampere/turn of the motor. As a matter of fact, this torque per ampere/turn depends on the width 31 of the coiled tooth but is not affected by the width 33 of the not coiled teeth, so long as the latter exhibit no saturation.

Using narrow poles for not coiled teeth makes it possible to have a very wide cut-out for the coil winding to go through. The width 32 of such cut-out is greater than the width 33 of a narrow tooth. This particular geometry of the stator makes it possible to manufacture the coil 41 to 46 separately and to insert them into the stator, around the wide teeth 11 to 16. Thus, the length of the coil winding and thus the volume of copper are optimised and the coils can come flush with the pole shoe of the tooth, which minimizes the leakage flux.

Advantageously, the stator 1 includes, between the coils 41 to 46, holes 47a to 47f for the passage of fixing members on a support, for a example screws or rivets. The geometry of the stator makes it possible to position the holes 47a to 47e within the outer diameter of the coils, which makes it possible to provide for an assembly of the motor without any outer tube. This makes it possible to reduce the number of parts and entails a gain in weight and in dimensions, with the diameter of the stator 1 thus becoming the outer diameter of the motor.

Figure 7A:
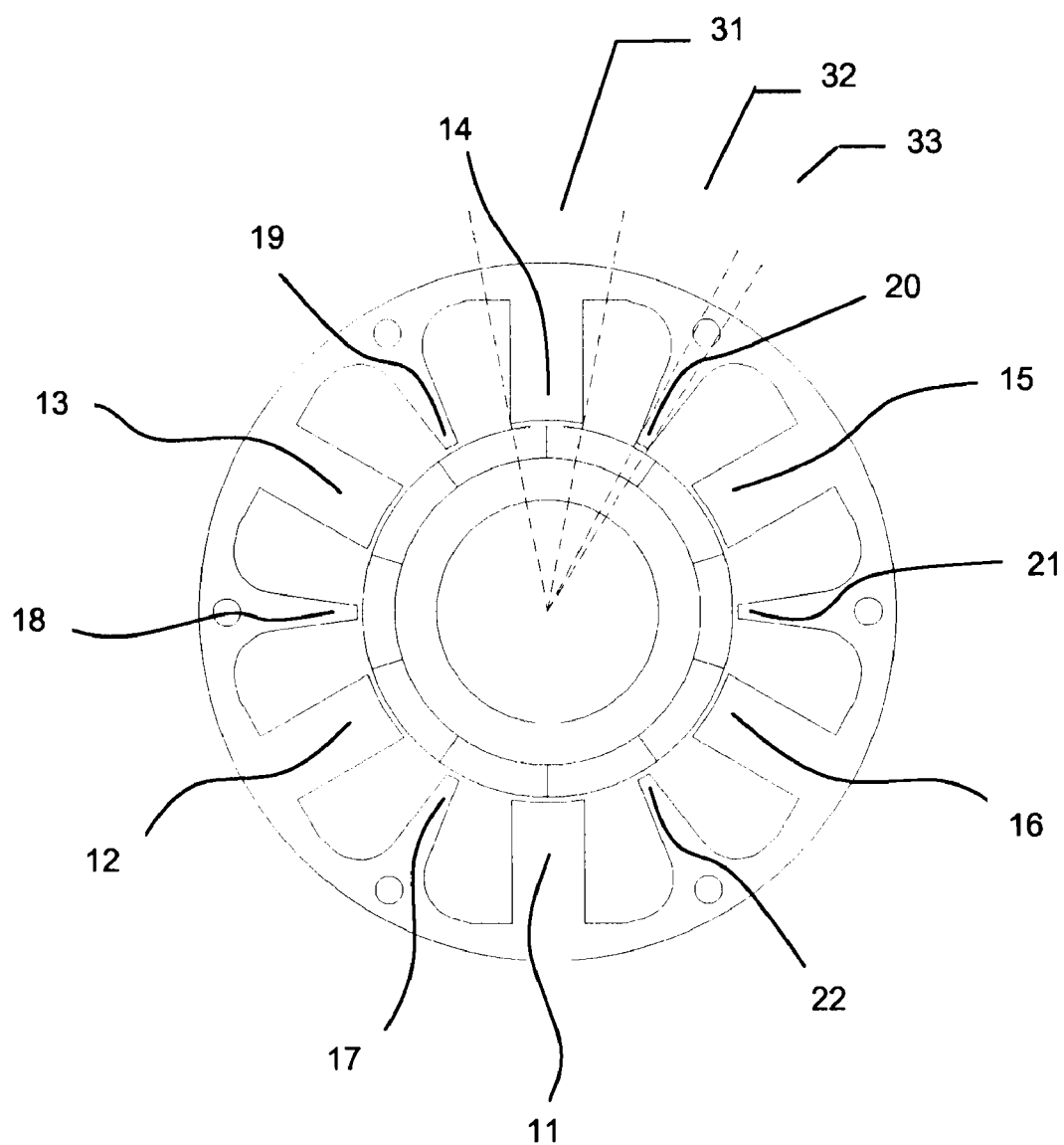
FIG. 7a shows a cross-sectional view of a motor according to the invention, with the ratio of the width of the wide tooth to the narrow tooth being particularly high.

The motor in FIG. 7a shows a preferred embodiment of the invention. The width ratio of the wide teeth 11 to 16 to the narrow teeth 17 to 22 is thus above 4, which makes it possible to increase the copper section of the coil windings and also to reduce the leakage permeance between the teeth.

Figure 7B:
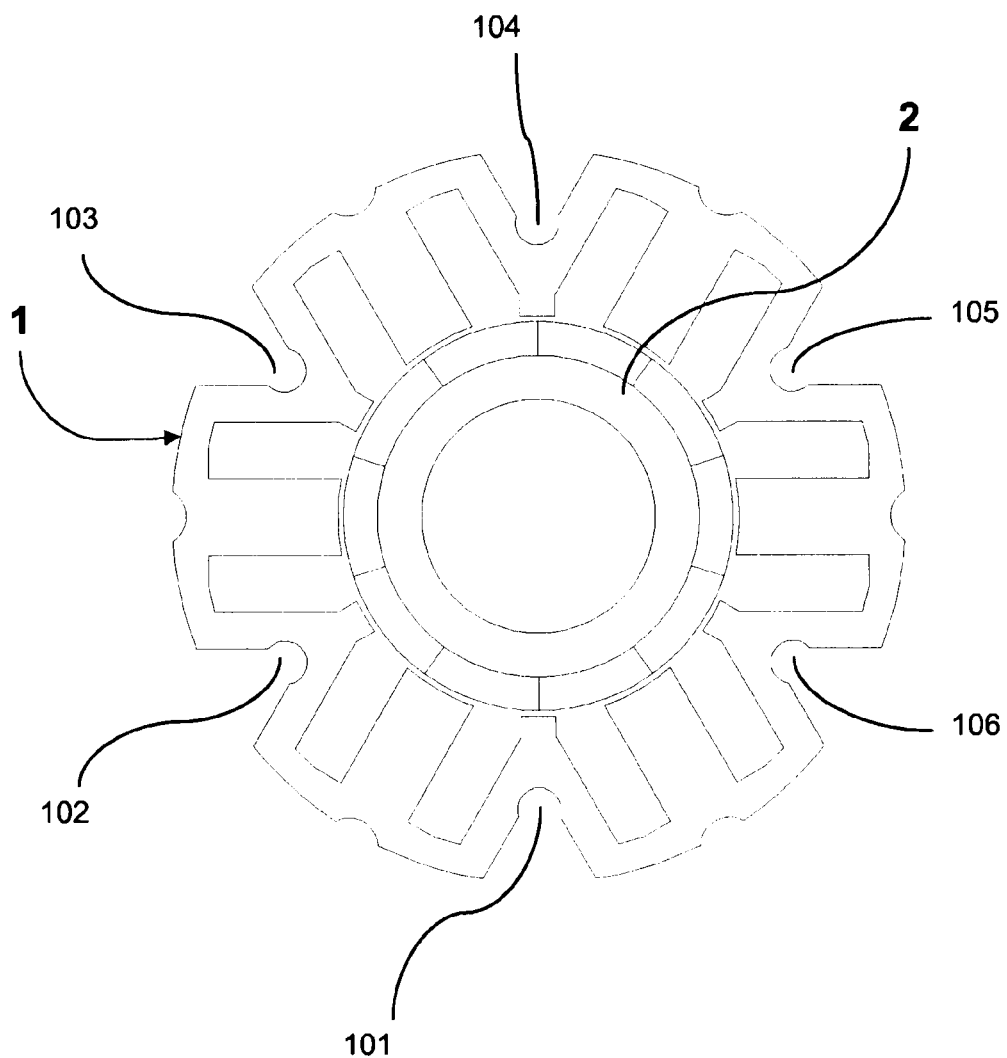
FIG. 7b shows a cross-sectional view of a motor according to the invention, with the stator 1 exhibiting 6 recesses 101 to 106 on the outer surface thereof, positioned between the coils.

FIG. 7b shows a preferred embodiment of the invention. As one of the limits of the electric motors is the temperature rise thereof, it is important to improve the surfaces of thermal exchange with the outside. For this purpose, the stator includes recesses on the outer surface thereof, which make it possible to increase the exchange surface thereof with the outside in an important way. Such recesses do not disturb the path of the magnetic field lines since the flux generated by each coiled pole is closed by the 2 adjacent poles.

The motors according to the invention and shown in FIGS. 1 and 7 are perfectly balanced as regards the radial forces with or without current because of their perfect diametral symmetry. For cost reasons, reducing the number of coils may be preferred in certain applications. In this case, only one wide tooth out of 2 will be coiled and the presence of radial forces will be accepted during the power supply to the coils.

Figure 8:
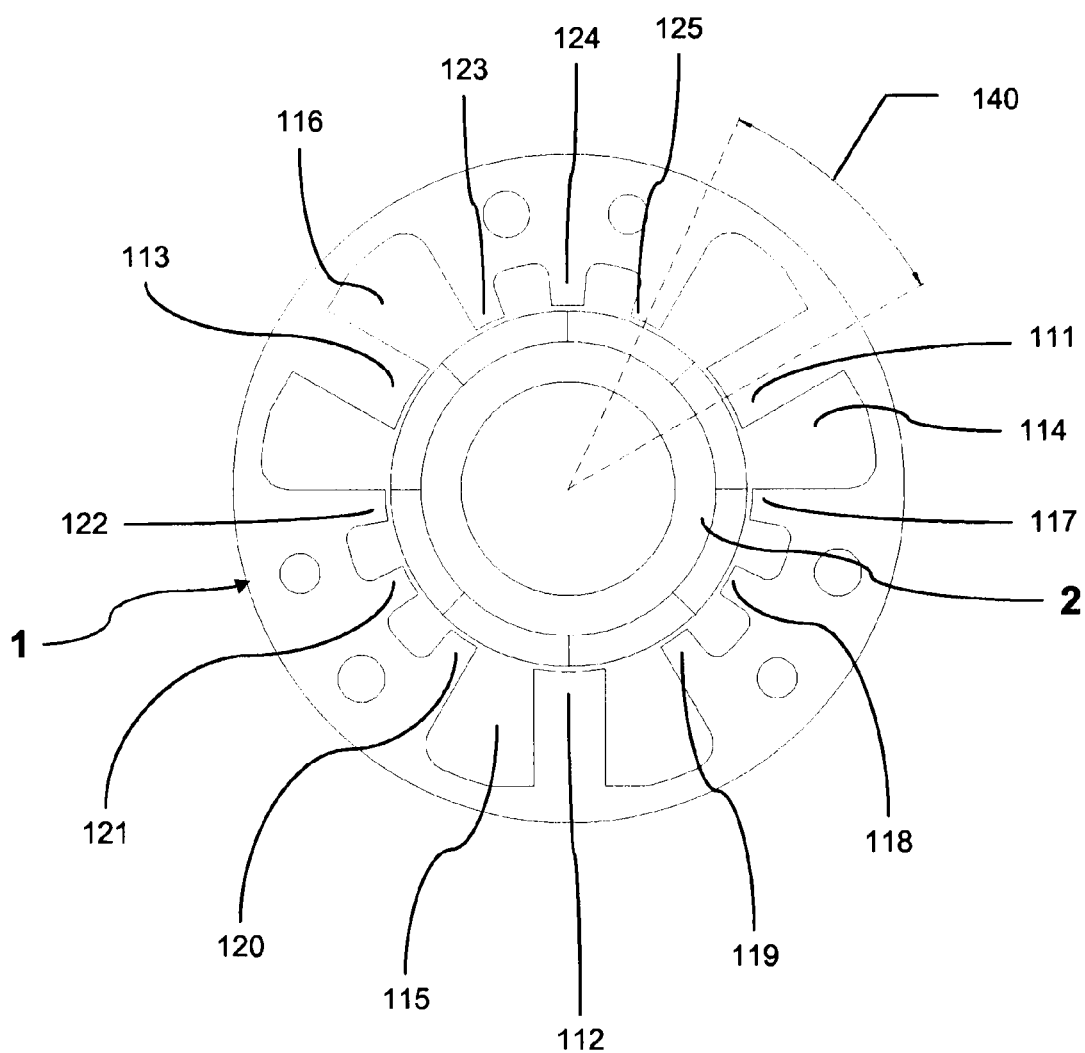
FIG. 8 shows a cross-sectional view of a motor according to the invention, with the stator 1 including 3 wide teeth 111 to 113 and 9 narrow teeth 117 to 125.
Figure 9:
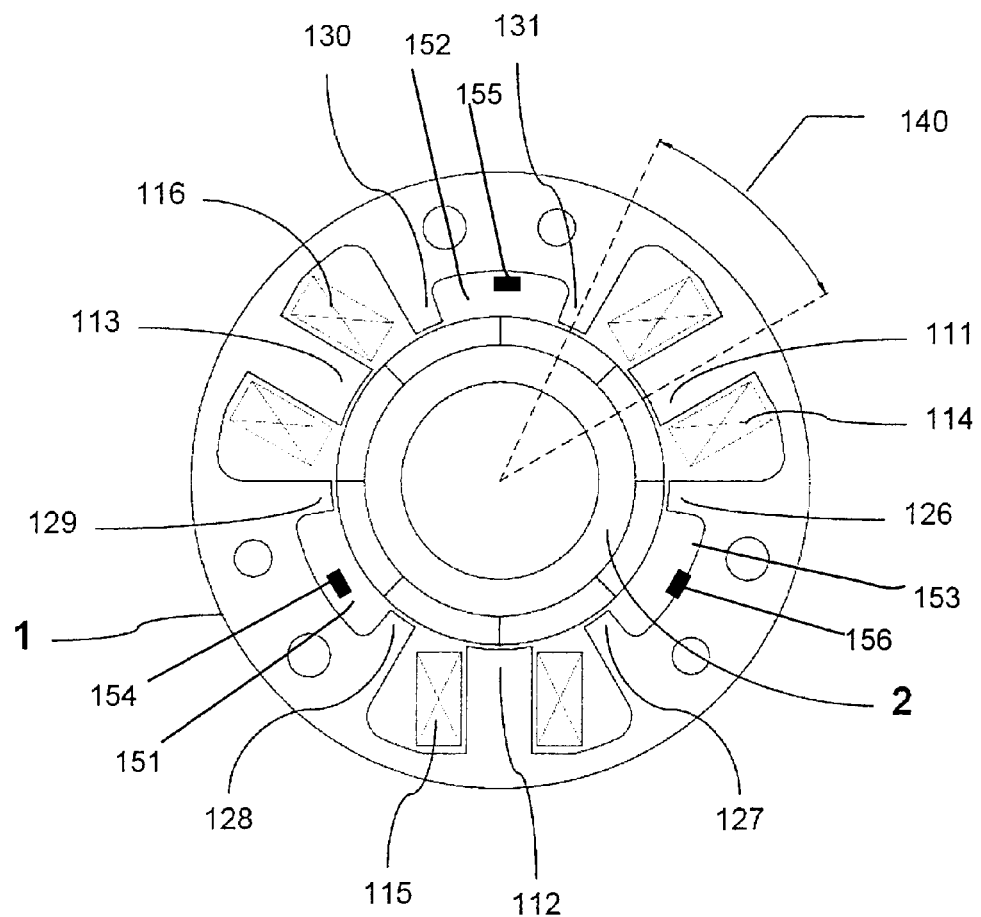
FIG. 9 shows a cross-sectional of view of a motor according to the invention, with the stator 1 including 3 wide teeth 111 to 113 and 6 narrow teeth 126 to 131.

FIGS. 8 and 9 show embodiments with only 3 coils, but with stator structures which still guarantee the low detent torque of the motor.

The motor represented in FIG. 8 shows 9 narrow teeth 117 to 125 and 3 wide teeth 111 to 113 supporting 3 coil windings 114 to 116. Not coiled wide teeth have thus been converted into narrow teeth, which makes it possible to increase the angle 140 between the coiled large teeth and the adjacent teeth.

The motor represented in FIG. 9 shows 6 narrow teeth 126 to 131 and 3 wide teeth 111 to 113 supporting 3 coiled windings 114 to 116. In this case, non coiled wide teeth have been eliminated. This makes it possible, as in the previous case, to increase the angle 140 between the coiled tooth and the adjacent teeth and thus to free spaces 151 to 153 allowing for example the insertion of position magnetic sensors 154, 155, and 156 cooperating with the rotor 2 of the motor.

The invention claimed is:

1. A polyphase electric motor comprising:
a stator part excited by electric coils; and
a rotor exhibiting N pairs of poles that are magnetized radially in alternate senses,
the stator part exhibiting wide teeth and narrow teeth extending radially from an annular ring,
wherein the coils are positioned around the wide teeth,
wherein the wide teeth exhibit a width greater than or equal to double the width of the narrow teeth,
wherein the width of cut-out is greater than the width of a narrow tooth, and
wherein the width of the narrow teeth and the width of the wide teeth are chosen to obtain a low detent torque.

2. A polyphase electric motor according to claim 1, wherein the coil windings are positioned around the wide teeth, and the wide teeth exhibit a width substantially double the width of the narrow teeth, and wherein the width of cut-out is greater than the width of a narrow tooth.

3. A polyphase electric motor according to claim 1, wherein the coil windings are positioned around the wide teeth, wherein the ratio of the width of a wide tooth to the width of a narrow tooth is between 4 and 5, and wherein the width of cut-out is greater than the width of a narrow tooth.

4. A polyphase electric motor according to claim 1, wherein the stator exhibits a number of narrow teeth equal to a number of wide teeth.

5. A polyphase electric motor according to claim 1, wherein the stator exhibits a number of narrow teeth that is a multiple of a number of wide teeth.

6. A polyphase electric motor according to claim 1, wherein the stator exhibits a winding on each of the wide teeth.

7. A polyphase electric motor according to claim 1, wherein the stator exhibits a winding on each of the wide teeth.

8. A polyphase electric motor according to claim 1, wherein the stator exhibits a coil winding on each second wide tooth of pairs of wide teeth.

9. A polyphase electric motor according to claim 2, wherein the stator exhibits a coil winding on each second wide tooth of pairs of wide teeth.

10. A polyphase electric motor according to claim 1, wherein each coiled tooth exhibits, in the transversal plane, a substantially constant trapezoid section.

11. A polyphase electric motor according to claim 1, wherein the coils are separately wound and inserted into the stator.

12. A polyphase electric motor according to claim 1, wherein a front end of a pole shoe is flush with an inner front face of the coil.

13. A polyphase electric motor according to claim 1, further comprising position detection elements acting with the rotor.

14. A polyphase electric motor according to claim 1, wherein the stator includes fixing holes positioned within an outer diameter of the coil windings.

15. A polyphase electric motor according to claim 1, wherein the stator exhibits recesses positioned between the coils.

16. A polyphase electric motor comprising:
- a stator part excited by electric coils; and
- a rotor exhibiting N pairs of poles that are magnetized radially in alternate senses,
- the stator part exhibiting wide teeth and narrow teeth extending radially from an annular ring,
- wherein the coil windings are positioned around the wide teeth,
- wherein the ratio of the width of a wide tooth to the width of a narrow tooth is between 2 and 8,
- wherein the width of cut-out is greater than the width of a narrow tooth, and
- wherein the width of the narrow teeth and the width of the wide teeth are chosen to obtain a low detent torque.

17. A polyphase electric motor according to claim 16, wherein the coil windings are positioned around the wide teeth, and the wide teeth exhibit a width substantially double the width of the narrow teeth, and wherein the width of cut-out is greater than the width of a narrow tooth.

18. A polyphase electric motor according to claim 17, wherein the coil windings are positioned around the wide teeth, wherein the ratio of the width of a wide tooth to the width of a narrow tooth is between 4 and 5, and wherein the width of cut-out is greater than the width of a narrow tooth.

19. A polyphase electric motor according to claim 16, wherein the stator exhibits a number of narrow teeth equal to a number of wide teeth.

20. A polyphase electric motor according to claim 16, wherein the stator exhibits a number of narrow teeth that is a multiple of a number of wide teeth.

21. A polyphase electric motor according to claim 16, wherein the stator exhibits a winding on each of the wide teeth.

22. A polyphase electric motor according to claim 17, wherein the stator exhibits a winding on each of the wide teeth.

23. A polyphase electric motor according to claim 16, wherein the stator exhibits a coil winding on each second wide tooth of pairs of wide teeth.

24. A polyphase electric motor according to claim 17, wherein the stator exhibits a coil winding on each second wide tooth of pairs of wide teeth.

25. A polyphase electric motor according to claim 16, wherein each coiled tooth exhibits, in the transversal plane, a substantially constant trapezoid section.

26. A polyphase electric motor according to claim 16, wherein the coils are separately wound and inserted into the stator.

27. A polyphase electric motor according to claim 16, wherein a front end of a pole shoe is flush with an inner front face of the coil.

28. A polyphase electric motor according to claim 16, further comprising position detection elements acting with the rotor.

29. A polyphase electric motor according to claim 16, wherein the stator includes fixing holes positioned within an outer diameter of the coil windings.

30. A polyphase electric motor according to claim 16, wherein the stator exhibits recesses positioned between the coils.

* * * * *